(12) United States Patent
Chang

(10) Patent No.: US 7,421,145 B2
(45) Date of Patent: Sep. 2, 2008

(54) IMAGE CORRECTION METHOD, APPARATUS, ARTICLE AND IMAGE

(75) Inventor: Tom-Chin Chang, Yun-Lin County (TW)

(73) Assignee: Transpacific IP Ltd., Taipei (TW)

( * ) Notice: Subject to any disclaimer, the term of this patent is extended or adjusted under 35 U.S.C. 154(b) by 624 days.

(21) Appl. No.: 10/064,612

(22) Filed: Jul. 31, 2002

(65) Prior Publication Data

US 2004/0022450 A1 Feb. 5, 2004

(51) Int. Cl.
*G06K 9/40* (2006.01)
*H04N 1/00* (2006.01)
*H04N 1/40* (2006.01)

(52) U.S. Cl. ......... 382/275; 358/463; 358/406

(58) Field of Classification Search ......... 358/443, 358/406, 463; 382/275
See application file for complete search history.

(56) References Cited

U.S. PATENT DOCUMENTS

| | | | | |
|---|---|---|---|---|
| 4,188,643 A | * | 2/1980 | Schayes et al. | 358/463 |
| 4,814,877 A | * | 3/1989 | Nagashima | 358/464 |
| 5,262,873 A | * | 11/1993 | Ishizuka | 358/443 |
| 5,502,578 A | * | 3/1996 | Smitt | 358/474 |
| 5,691,827 A | * | 11/1997 | Kamei et al. | 358/530 |
| 5,784,180 A | * | 7/1998 | Sakai et al. | 358/501 |
| 5,943,141 A | * | 8/1999 | Tamura | 358/461 |
| 6,134,025 A | * | 10/2000 | Takeuchi et al. | 358/1.2 |

\* cited by examiner

*Primary Examiner*—Bhavesh Mehta
*Assistant Examiner*—Manav Seth
(74) *Attorney, Agent, or Firm*—Stolowitz Ford Cowger LLP

(57) ABSTRACT

An image correction method able to avoid error image. According to opposite properties of black and white, only the last few bits of the scanned digital signal are extracted for black correction, while only the first few bits of the scanned digital signal are extracted for white correction. Further, the most significant bit of the digital signal is 1 for white correction. Therefore, the unwanted LBB effect on the scanned image caused by dust or spot on the correction document is avoided. In addition, as only a few bits of the scanned digital signal are extracted, the requirement in memory capacity is reduced.

32 Claims, 2 Drawing Sheets

IMAGE CORRECTION METHOD, APPARATUS, ARTICLE AND IMAGE

BACKGROUND OF INVENTION

1. Field of the Invention

This invention relates in general to an image correction method, and more particularly, to an image correction method to help avoid error images.

2. Description of the Related Art

In terms of functionalities, the scanner is an intermediate between the photocopier and the camera. In the past, the application of scanners is restricted to special art work due to the very high cost. In recent years, the rapidly growing computer technique and the active competition in the market result in signification cost reduction for the scanners. Eventually, the scanner has become a popular peripheral of personal computers.

Depending on the price or functionality, scanners can be categorized into several types. Typically scanners can be categorized into handheld scanner, sheet-feed scanner, card reader, film scanner and flatbed scanner. The flatbed scanner includes a glass flatbed on which the document to be scanned is disposed. By shifting the sensor, the information of the document is read. As the structure is not very complex, and the method for using it is not difficult, plus the outstanding function expandability, the flatbed scanners have become the application mainstream for the current computers.

Basically, scanners are divided into black-and-white type and color type with respect to color display, and reflective type and transparent type with respect to the scanning method. The following uses a reflective type color scanner as an example to introduce the basic structure of a scanner. Referring to FIG. 1, the basic structure of a color scanner 10 is shown. The color scanner 10 comprises a lamp 102, an optical system 104, a charge-coupled device (CCD) 106, and an analog/digital (A/D) converter 108. Functions of various parts of the color scanner 10 are further described as follows.

When the lamp 102 is used as the light source of the color scanner 10, the light generated by the lamp 102 is incident on the document 110. The light is then reflected by the document 110 to project onto the optical system 104. The lamp 102 can be a fluorescent lamp, a cold cathode ray tube, or a light emitting diode array.

The optical system 104 consists of a reflection mirror 112 and a lens 114. Being focused by the reflection mirror 112 and the lens 114, the light reflected by the document 110 is reflected by the reflection mirror 112, focused by the lens 114, and then incident on the charge-coupled device 106.

The function of the charge-coupled device 106 includes converting the detected light intensity into photocurrent, which is then stored in the storage electrodes and converted into signal charges to generate various potential.

The analog/digital converter 108 converts the analog signal of the charge-coupled device 106 into a digital signal, and transmits the digital signal into a computer 118.

When the scanner is scanning a document or a picture, the non-uniformity of the lamp requires an image compensation operation. Generally speaking, a correction document is used for image correction. For example, for the reflective type scanning, a black correction document and a white correction document are used for image correction. If the correction document contains any unwanted object thereon, the unwanted streaking (LBB) effect is generated in the scanned image. Currently, there is no image correction method able to avoid such LBB effect.

SUMMARY OF INVENTION

The present invention provides an image correction method to avoid error images. According to black and white characteristics, only the last few bits of a scanned digital signal are extracted during black correction. While performing white correction, only the first few bits of the scanned digital signal are extracted. The most significant bit of the digital signal is set as 1. Therefore, the LBB effect in scanned image caused by dust or spot on the correction document is avoided. Further, as fewer bits are extracted while scanning the digital signal, the memory requirement is reduced.

The image correction method able to avoid error images provided by the present invention is suitable for use in a scanner. While performing black correction, a first correction digital signal is obtained,by scanning a first document. Only the last few bits of the first correction digital signal are extracted. While performing white correction, a second correction digital signal is obtained by scanning a second correction document, and only first few bits of the second correction digital signal are extracted. Meanwhile, the most significant bit of the second correction digital signal is, set as 1.

In one embodiment of the present invention, the last few bits of the first correction digital signal are stored in a memory. The memory includes a random access memory (RAM).

In one embodiment of the present invention, the first few bits of the second digital signal are stored in a memory such as a random access memory.

In one preferred embodiment of the present invention, the first correction document includes a black document.

In one preferred embodiment of the present invention, the second correction document includes a white correction document.

In one embodiment of the present invention, the black correction includes the following steps. When the first correction signal is obtained by scanning the first correction document, an image extraction device is used to obtain the first correction analog signal. The first correction analog signal is then converted into a first correction digital signal by the image extraction device. The image extraction device includes a charge-coupled device.

The step of performing white correction further includes the following steps. When the second correction signal is obtained by scanning the second correction document, the image extraction device is used to obtain the second correction analog signal. The second correction analog signal is then converted into a second correction digital signal by the image extraction device.

According to the above, the present invention provides an image correction method able to avoid error images. According to two opposite characteristics of black and white, only the last few bits of the digital signal obtained by scanning are extracted during black correction. While performing white correction, only the first few bits of the digital signal obtained by scanning are extracted, and the most significant bit of the digital signal is configured as 1. Therefore, the LBB effect on the image caused by dust or spot on the correction document is avoided. Further, in the digital signal obtained by scanning, fewer bits are extracted, so that the required memory capacity is reduced.

BRIEF DESCRIPTION OF DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

Both the foregoing general description and the following detailed description are exemplary and explanatory only and are not restrictive of the invention, as claimed.

DETAILED DESCRIPTION

Prior to the description of the embodiment, it should be noted that although the embodiment is described using the scanning process for the reflection document as an example, for those skilled in the art, the invention is also applicable to the scanning process for the transparent document.

Figure 1:
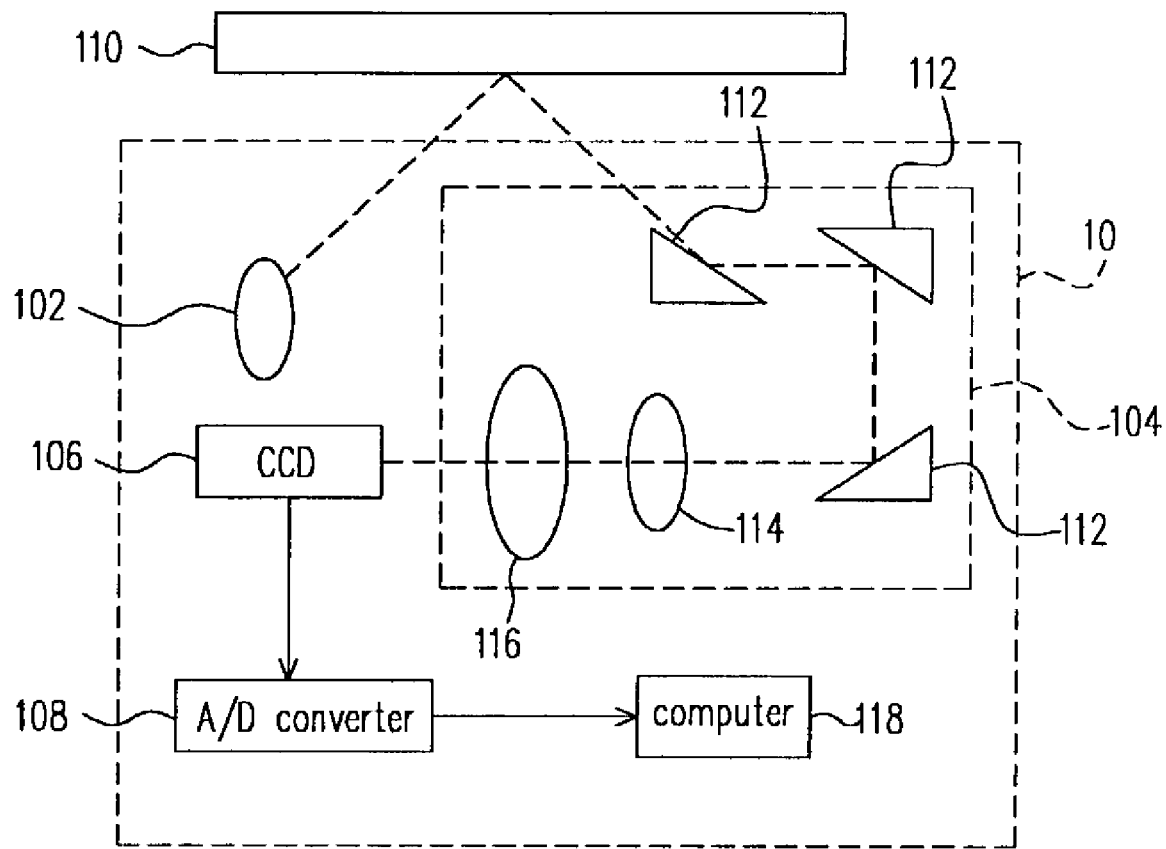
FIG. 1 shows the basic structure of a color scanner.
Figure 2:
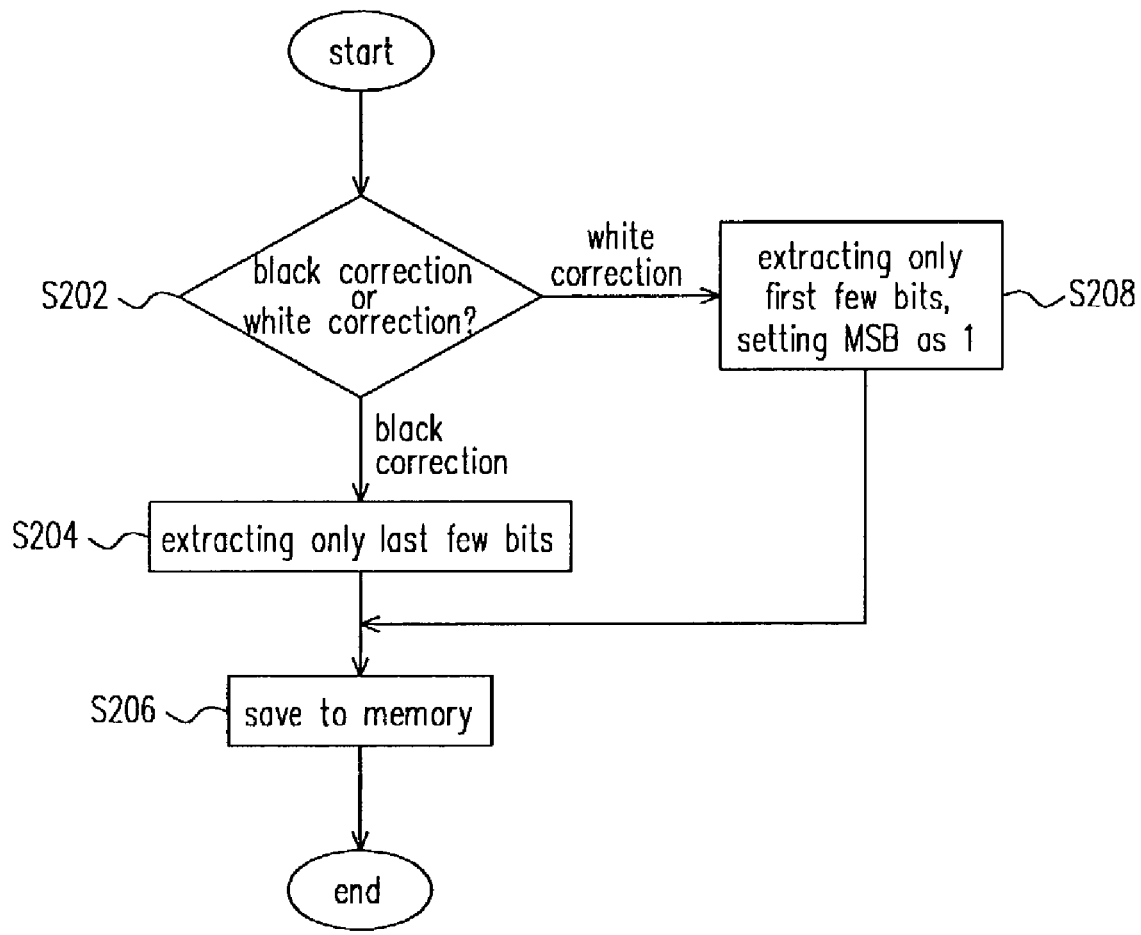
FIG. 2 shows the process flow of an image correction method for helping to avoid errors in images according to the present invention.

Referring to FIG. 2, an image correction method able to avoid error images in one embodiment of the present invention is illustrated. In the image correction method, firstly, whether a black correction or a white correction is performed is determined in step s202. While performing black correction, the scanner uses the lamp to radiate a light on a first correction document. The light reflected by the document is then incident on a reflection mirror of an optical system, and focused by a lens of the optical system to obtain a first correction optical signal. An optoelectric conversion is performed to convert the first correction optical signal into an electrical first correction analog signal by an image extraction device (such as charge-coupled device). The first correction analog signal is then converted into a first correction digital signal by an analog/digital converter. While performing black correction, the response of the image extraction device is small, such that the first few bits of the first digital correction signal are zero, and only the last few bits (such as last 8 bits) are extracted. That is, only a few bits at the end of the first digital correction signal are extracted. Thus, the LBB effect caused by dust or spot on the first correction document is avoided. Further, the first correction document includes a black correction document (s204). Only the extracted last few bits of the first correction digital signal are stored in a memory such as a random access memory, so that the storage capacity requirement of the memory is reduced (s206).

When white correction is performed, the lamp of the scanner is incident on the second document. The light is then reflected by the second document, incident on the reflection mirror of the optical system, and focused by the lens of the optical system to obtain a second correction optical signal. The second correction optical signal is converted into an electrical second correction analog electric signal by optoelectric conversion via the image extraction device. The second correction analog electric signal is converted into a second correction digital signal via the analog/digital converter. While performing white correction, the response of the image extraction device is significant, so that the most significant bit of the second digital correction signal has to be set as 1. Therefore, only the first few bits (such as first 8 bits) of the second correction digital signal are extracted. In this way, the LBB effect caused in the scanned image by dust or spot on the second correction document is avoided. The second correction document includes a white correction document (s208). The extracted first few bits of the second correction digital signal are stored in the memory such as the random access memory. As only the last few bits of the second correction digital signal are stored, the requirement in storage capacity of the memory is reduced (s210).

According to the above, the present invention uses the opposite characteristics of black and white to extract only the last few bits of the scanned digital signal for black correction and the first few bits of the scanned digital signal for white correction. Meanwhile, the most significant bit of the scanned digital signal for white correction is 1. Therefore, the LBB effect caused on the scanned image by dust or spot on the correction document is avoided. Further, in the scanned digital signal, fewer bits are extracted to reduce the capacity requirement of the memory.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

The invention claimed is:

1. A method comprising:
    obtaining a first correction digital signal by scanning a first correction document during black correction, extracting only a plurality of last bits of the first correction digital signal, and storing the extracted last bits of the first correction digital signal in a memory; and
    obtaining a second correction digital signal by scanning a second correction document during white correction, extracting only a plurality of first bits of the second correction digital signal, setting the most significant bit of the second correction digital signal to a value of one, and storing the extracted first bits of the second correction digital signal in the same or a different memory;
    wherein the extraction and storage of the last bits of the first correction digital signal and the first bits of the second correction digital signal reduces a memory requirement for scanning the correction documents.

2. The method according to claim 1, wherein the memory comprises a random access memory.

3. An apparatus comprising:
    means for obtaining a first correction digital signal, said means for obtaining a first correction digital signal configured to scan a first correction document during black correction, to extract only a plurality of last bits of the first correction digital signal;
    means for obtaining a second correction digital signal by scanning a second correction document during white correction, said means for obtaining a second correction digital signal configured to extract only a plurality of first bits of the second correction digital signal; and
    means for setting the most significant bit of the second correction digital signal to a value of one.

4. The apparatus according to claim 3, further comprising:
    means for storing the extracted bits after the most significant bit is set.

5. The apparatus according to claim 4, wherein the extracted bits are stored in a random access memory.

6. The apparatus according to claim 3, further comprising means for storing the extracted first bits of the second correction digital signal in a memory.

7. The apparatus according to claim 6, wherein the memory comprises a random access memory.

8. The apparatus according to claim 3, wherein the first correction document comprises a black correction document.

9. The apparatus according to claim 3, wherein the second correction document comprises a white correction document.

10. The apparatus according to claim 3, further comprising:

means for scanning the first correction document to obtain a first correction optical signal;
means for obtaining a first correction analog signal; and
means for converting the first correction analog signal into a first correction digital signal.

11. The apparatus according to claim 10, wherein obtaining means comprises a charge-coupled device.

12. The apparatus according to claim 3, further comprising:
means for scanning the second correction document to obtain a second correction optical signal;
means for obtaining a second correction analog signal; and
means for converting the second correction analog signal into a second correction digital signal.

13. The apparatus according to claim 12, wherein obtaining means comprises a charge-coupled device.

14. A scanning device operable to:
obtain a first correction digital signal by scanning a first correction document during black correct on and extract only a plurality of last bits of the first correction digital signal; and
obtain a second correction digital signal by scanning a second correction document during white correction, extract only a plurality of first bits of the second correction digital signal, and set the most significant bit of the second correction digital signal to a value of one.

15. The scanning device of claim 14, further operable to:
store the extracted last bits of the first correction digital signal in random access memory.

16. The scanning device of claim 14, further operable to:
store the extracted bits of the second correction digital signal in random access memory.

17. The scanning device of claim 14, further operable to:
scan the first correction document to obtain a first correction optical signal;
use an image extracting device to obtain a first correction analog signal; and
use an analog/digital converter to convert the first correction analog signal into a first correction digital signal.

18. The scanning device of claim 17, further operable to:
scan the second correction document to obtain a second correction optical signal;
use the image extracting device to obtain a second correction analog signal; and
use the analog/digital converter to convert the second correction analog signal into a second correction digital signal.

19. An image made by a method comprising:
obtaining a first correction digital signal by scanning a first correction document during black correction, and extracting only a plurality of the last bits of the first correction digital signal; and
obtaining a second correction digital signal by scanning a second correction document during white correction, extracting only a plurality of first bits of the second correction digital signal, and setting the most significant bit of the second correction digital signal to a value of one.

20. The image of claim 19 made by a method further comprising:
storing the extracted last bits of the first correction digital signal in random access memory.

21. The image of claim 19 made by a method further comprising:
storing the extracted last bits of the second correction digital signal in random access memory.

22. The image of claim 19 wherein the black correction comprises:
scanning the first correction document to obtain a first correction optical signal;
using an image extracting device to obtain a first correction analog signal; and
using an analog/digital converter to convert the first correction analog signal into a first correction digital signal.

23. The image of claim 22 wherein the white correction comprises:
scanning the second correction document to obtain a second correction optical signal;
using the image extracting device to obtain a second correction analog signal; and
using the analog/digital converter to convert the second correction analog signal into a second correction digital signal.

24. A method comprising:
obtaining a first correction digital signal by scanning a first correction document during black correction, extracting only a plurality of last bits of the first correction digital signal; and
obtaining a second correction digital signal by scanning a second correction document during white correction, extracting only a plurality of first bits of the second correction digital signal, setting the most significant bit of the second correction digital signal to a value of one.

25. The method according to claim 24, wherein the extracted last bits of the first correction digital signal are stored in a memory.

26. The method according to claim 24, wherein the extracted first bits of the second correction digital signal are stored in a memory.

27. The method according to claim 24, wherein the first correction document comprises a black correction document.

28. The method according to claim 24, wherein the second correction document comprises a white correction document.

29. The method according to claim 24, further comprising:
scanning the first correction document to obtain a first correction optical signal;
using an image extracting device to obtain a first correction analog signal; and
converting the first correction analog signal into a first correction digital signal.

30. The method according to claim 29, wherein the image extraction device comprises a charge-coupled device.

31. The method according to claim 29, further comprising:
scanning the second correction document to obtain a second correction optical signal; using the image extracting device to obtain a second correction analog signal; and converting
the second correction analog signal into a second correction digital signal.

32. The method according to claim 31, wherein the image extraction device comprises a charge-coupled device.

* * * * *

UNITED STATES PATENT AND TRADEMARK OFFICE
CERTIFICATE OF CORRECTION

PATENT NO. : 7,421,145 B2  
APPLICATION NO. : 10/064612  
DATED : September 2, 2008  
INVENTOR(S) : Chang Page 1 of 1

It is certified that error appears in the above-identified patent and that said Letters Patent is hereby corrected as shown below:

At column 5, line 19, please replace "black correct on and" with --black correction and--.
At column 6, line 56, please replace "converting ¶ the second" with --converting the second--.

Signed and Sealed this

Eleventh Day of August, 2009

David J. Kappos
*Director of the United States Patent and Trademark Office*